United States Patent [19]
Li

[11] Patent Number: 5,518,560
[45] Date of Patent: May 21, 1996

[54] METHOD AND SYSTEM FOR CONTROLLING ELECTROMAGNETIC FIELD GENERATOR FOR ADHESIVE CURING AND SENSING DEVICE FOR USE THEREIN

[75] Inventor: Chi Li, Orchard Lake, Mich.

[73] Assignee: Ford Motor Company, Dearborn, Mich.

[21] Appl. No.: 311,976

[22] Filed: Sep. 26, 1994

[51] Int. Cl.$^6$ .................................................. B32B 31/00
[52] U.S. Cl. .................... 156/64; 156/359; 156/379.6; 156/379.8; 156/380.6; 219/633; 219/667
[58] Field of Search ..................... 156/64, 350, 358, 156/359, 379.6, 379.7, 379.8, 380.2, 380.6, 380.9; 364/472, 473, 557; 374/163, 165; 219/633, 663, 667

[56] References Cited

U.S. PATENT DOCUMENTS

| | | | |
|---|---|---|---|
| 2,465,322 | 3/1949 | Considine | 136/4 |
| 3,626,758 | 12/1971 | Stewart et al. | 73/355 R |
| 3,969,943 | 7/1976 | Ohno et al. | 73/355 EM |
| 4,214,164 | 7/1980 | Traub et al. | 250/338 |
| 4,396,791 | 8/1983 | Mazzoni | 136/221 |
| 4,525,080 | 6/1985 | Smith | 374/115 |
| 4,642,155 | 2/1987 | Ramsey | 156/359 |
| 4,647,222 | 3/1987 | Schultheiss | 374/139 |
| 4,695,335 | 9/1987 | Lyall | 156/64 |
| 4,859,079 | 8/1989 | Wickersheim et al. | 374/131 |
| 5,047,605 | 9/1991 | Ogden | 219/633 |
| 5,164,999 | 11/1992 | Shifflett | 385/12 |
| 5,366,580 | 11/1994 | Czach | 156/359 |

*Primary Examiner*—David A. Simmons
*Assistant Examiner*—Paul M. Rivard
*Attorney, Agent, or Firm*—Joseph W. Malleck; Roger L. May

[57] ABSTRACT

A contamination-resistant, temperature-sensing device for sensing the extent of conductive heat flow from a metal surface in a method and system are disclosed. A heat transfer member is mounted to one end of a thermally insulative tube. The heat transfer member has two oppositely facing surfaces, one of which engages the metal surface to receive conductive heat flow therefrom, the other of which radiates transferred heat through the tube. A sensor is mounted to the other end of the tube to detect the extent of heat radiated through the tube and hence the extent of conductive heat flow from the metal surface. The sensing device also includes a housing surrounding the tube and the sensor. In addition, the sensing device includes a variable rate coil spring to allow the heat transfer member to bear against the metal surface at a constant contact force. A controller is electrically coupled to the sensor for controlling the extent of conductive heat flow from the metal surface based on the detected heat radiated through the tube.

16 Claims, 2 Drawing Sheets

METHOD AND SYSTEM FOR CONTROLLING ELECTROMAGNETIC FIELD GENERATOR FOR ADHESIVE CURING AND SENSING DEVICE FOR USE THEREIN

TECHNICAL FIELD

This invention relates to methods and systems for controlling electromagnetic field generators which are used for adhesive curing and temperature sensing devices for use therein.

BACKGROUND ART

Separately stamped metal sheets are secured to each other to form body panels in automotive applications using induction bonding. An electromagnetic field is applied to the metal sheets, generating an eddy current which heats the metal sheets to allow the adhesive to cure such that the metal sheets are bonded together. The temperature of the body panels needs to be controlled during bonding since the temperature affects the strength of the adhesive bond between the two metal sheets. Therefore, the temperature of the metal sheets requires accurate monitoring.

Currently, the temperature of the metal sheets in the induction bonding process is difficult to monitor due to the problems associated with measuring temperatures on strong electromagnetic fields. Conventionally, the temperature of the metal sheets is typically measured using thermocouples or infrared sensors. When using thermocouples, the eddy current generated by the electromagnetic field affects the current of the thermocouple, thereby providing inaccurate temperature readings.

When using infrared sensors, contamination such as dust, mill oil and scratches, affects the sensor output as well as emissivity and ambient reflections. Mill oil is used in the stamping process of the metal sheets to prevent tearing. The mill oil is not removed prior to bonding the metal sheets. This mill oil affects the emissivity of the metal sheets, which is a primary source of errors in infrared temperature measurement. The emissivity of a surface is the percentage of the surface that emits. The more a surface emits, the more accurate the temperature reading.

A temperature-measuring device is disclosed in U.S. Pat. No. 4,396,791 issued to Mazzoni. Mazzoni discloses a cylindrical probe adapted for tension adjustment for measuring the temperature of a laminator platen. A thermocouple is attached to a thermally conductive body of the probe. The Mazzoni device measures temperature via a thermocouple, which is subject to error when placed in an electromagnetic field.

A temperature-measuring device is also disclosed in U.S. Pat. No. 3,626,758 issued to Stewart et al. Stewart et al discloses a temperature sensor for measuring temperature in a particular region. The Stewart et al device includes a conical tip to be inserted into the region to be measured. The conical tip of the Stewart et al device is not suitable for measuring the temperature of a solid surface.

A problem of the known prior art, therefore, is that temperature measurements of metal sheets during induction bonding are difficult to obtain accurately due to the strong electromagnetic field, mill oil and the changing surface emissivity of the metal sheets.

DISCLOSURE OF THE INVENTION

The present invention contemplates a sensing device that accurately measures the temperature of metal sheets positioned in an electromagnetic field, thereby enabling accurate control of an induction bonding process of joining metal sheets.

The present invention also contemplates a sensing device that is sealed to prevent inaccurate temperature measurements caused by contamination.

Further, the present invention contemplates a temperature-sensing device comprising a heat transfer member mounted to a thermally insulative tube. The heat transfer member has two oppositely faced surfaces, one of which engages the metal surface to receive conductive heat flow therefrom, and the other of which radiates transferred heat through the tube. The temperature-sensing device further includes a sensor mounted to the other end of the tube to detect the extent of heat radiated through the tube and hence the extent of conductive heat flow from the metal surface.

Further in accordance with the invention, the sensing device includes a housing having a longitudinal axis surrounding the tube and the sensor. The housing also includes an aperture at one end to allow the tube to extend therefrom.

In carrying out a further aspect of the invention, the sensing device includes a variable rate coil spring mounted on the sensor to bias the sensor relative to the housing along the longitudinal axis. As the heat transfer member bears against an irregular surface, the sensor will reciprocate along the longitudinal axis to cause the heat transfer member to bear against the metal surface at a constant contact force.

In carrying out yet another aspect of the invention, the sensing device is electrically coupled to a controller. The controller controls the extent of conductive heat flow from the metal surface based on the detected heat radiate through the tube.

In carrying out the above objects and other objects of the present invention, a method is provided for controlling an electromagnetic field generator for adhesive curing.

The method begins with the step of applying an electromagnetic field to a thermally conductive member.

The method continues with the step of providing a heat transfer member to transfer heat from the thermally conductive member. Next, the method includes maintaining the heat transfer member in contact with the thermally conductive member.

The method also includes the step of radiating the heat energy from the heat transfer member. Next, the radiated heat energy is sensed to provide a corresponding electronic signal.

Finally, the method concludes with the step of controlling the electromagnetic field applied to the thermally conductive member based on the electronic signal.

Further, in carrying out the above objects and other objects of the present invention, a system is provided for carrying out the above method steps.

These and other objects, features and advantages will be readily apparent from the following detailed description of the best mode for carrying out the invention when read in connection with the accompanying drawings.

BRIEF DESCRIPTION OF THE DRAWINGS

The present invention will be apparent from the detailed description taken in conjunction with the accompanying drawings in which.

BEST MODE FOR CARRYING OUT THE INVENTION

Figure 1:
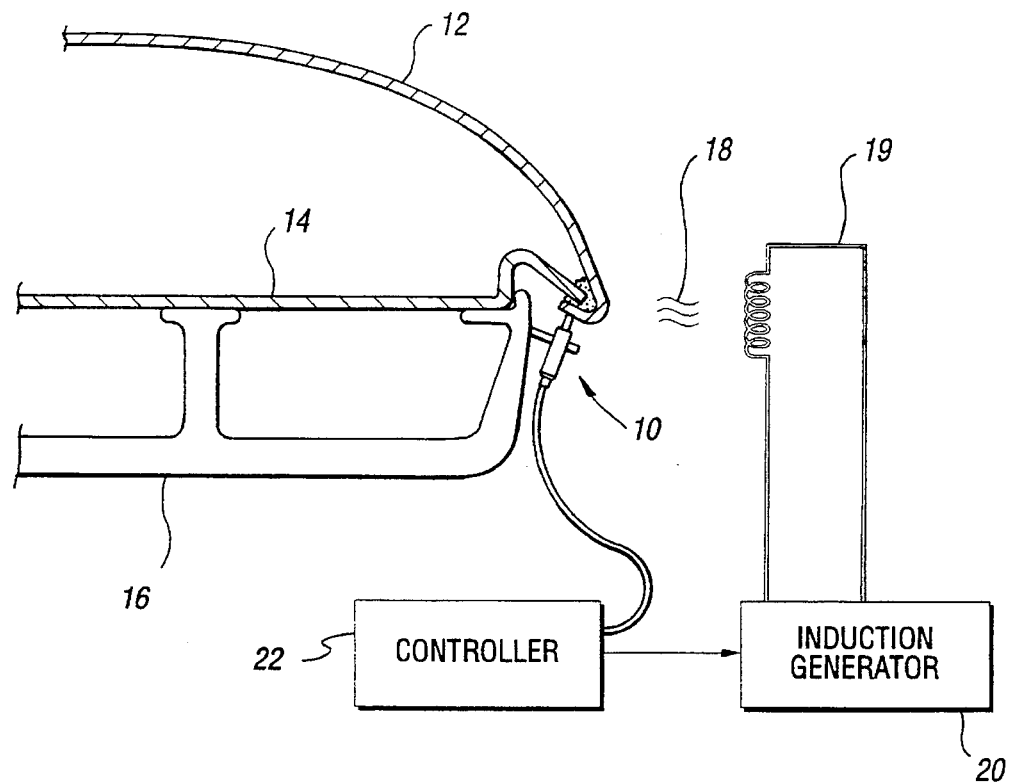
FIG. 1 is a schematic view illustrating a control system for use in a vehicle application of the present invention.

Referring now to FIG. 1, there is shown a temperature-sensing device 10 being used in a particular vehicle application. A thermally conductive member formed into an outer body panel 12 is to be adhesively bonded to a thermally conductive member formed into an inner body panel 14. The outer body panel 12 and the inner body panel 14 are secured into their final position and placed upon a fixture 16 prior to induction bonding.

The outer body panel 12 and the inner body panel 14 are bonded to each other via an electromagnetic field 18 being applied to the body panels. The electromagnetic field 18 is produced by an induction coil 19 and an induction generator 20. The electromagnetic field 18 generates an eddy current in the body panels 12, 14, thereby heating up the body panels to a temperature at which the adhesive cures and the thermally conductive members are bonded together.

The sensing device 10 is secured to the fixture 16 and placed in contact with the outer body panel 12. The sensing device 10 measures the temperature of the outer body panel 12. The sensing device 10 is electrically coupled to a controller 22. The controller 22 determines the difference between the measured temperature and a predetermined temperature necessary for proper bonding. Based on the difference between the two temperatures, the strength of the electromagnetic field 18 is adjusted accordingly. As a result, accurate electromagnetic field strength is maintained to achieve proper bonding of the outer body panel 12 to the inner body panel 14.

Figure 2:
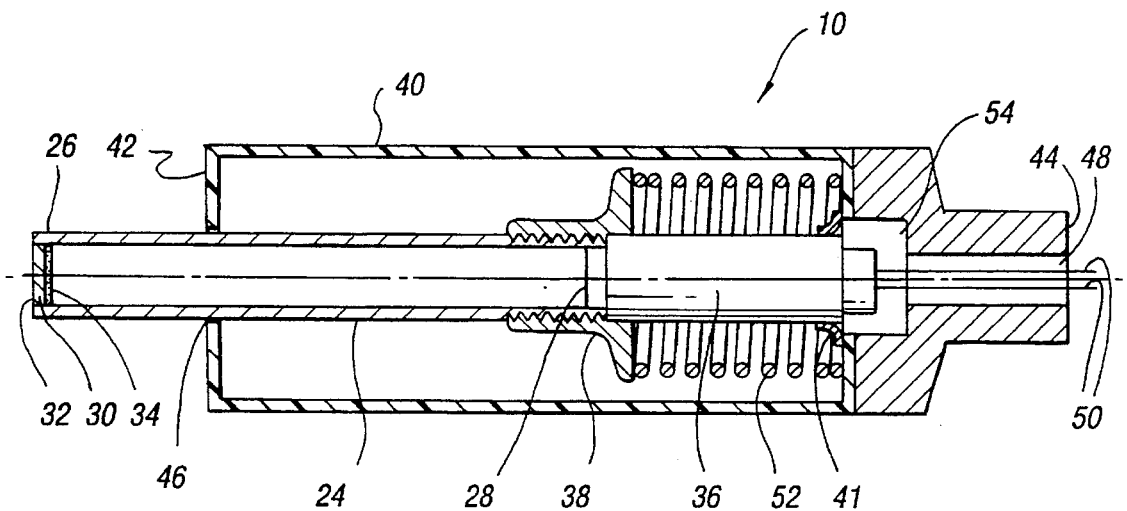
FIG. 2 is a sectional view of a preferred embodiment of a sensor for use in the system of the present invention.

Referring now to FIG. 2, there is shown a temperature-sensing device 10 made in accordance with the teachings of the preferred embodiment of this invention. The sensing device 10 comprises a thermally insulative tube 24. The tube 24 has a first end 26 and a second end 28. The tube 24 has substantially a constant diameter. The tube 24, preferably, is made of a highly insulative plastic material so that it does not absorb any of the transferred heat from the thermally conductive member (not shown), but rather directs it to a receiving object as described below.

Mounted to the first end 26 of the tube 24 is a heat transfer member 30. The heat transfer member 30 has a first surface 32 and an oppositely facing second surface 34. The first surface 32 engages the thermally conductive member to receive conductive heat energy therefrom. The first surface 32 is a flat planar surface, and substantially the entire first surface 32 engages the thermally conductive member. The second surface 34 radiates the transferred heat energy through the tube 24. The second surface 34 is also a flat planar surface, and substantially the entire second surface 34 radiates the transferred heat energy.

In the preferred embodiment, the heat transfer member 30 is a thin, high conductivity metal disk, e.g., copper or aluminum. Preferably, the second surface 34 of the heat transfer member 30 is coated with black paint having a known infrared emissivity. The black paint allows the second surface 34 of the heat transfer member 30 to act as a perfect emitter of the heat energy transferred from the thermally conductive member.

A sensor 36 is mounted to the second end 28 of the tube 24 via a mounting bracket 38 having a radially outwardly extending annular flange. The sensor 36 has a diameter substantially the same as the diameter of the tube 24. The sensor 36 detects the extent of heat energy radiated through the tube 24 via the heat transfer member 30 and, hence, the extent of conductive heat energy from the thermally conductive member. In the preferred embodiment, the sensor 36 is an optical sensor, such as an infrared sensor, which detects the amount of heat energy radiated from the thermally conductive member.

The mounting bracket 38 is a hollow tube having helical grooves disposed in the interior of the bracket 38. The sensor 36 and the second end 28 of the tube 24 screw into each end of the mounting bracket 38.

The combination of the tube 24, the heat transfer member 30 and the sensor 36 are not affected by the generated electromagnetic field, thereby allowing accurate temperature measurements to be obtained. In addition, the thermally insulative tube 24 surrounding the heat transfer member 30 prevents ambient reflections from reaching the sensor 36 and minimizes heat loss between the metal surface and the sensor 36. The heat transfer member 30 provides constant surface emissivity and constant contact with the metal surface. The present invention allows a user to obtain accurate and repeatable temperature measurements.

Further in accordance with the invention, a housing 40 in the form of a second tube is provided to help prevent inaccuracies due to contamination. The housing 40 has a longitudinal axis and concentrically surrounds the tube 24 and the sensor 36. The sensor 36 is mounted within the housing 40 via a second mounting bracket 41. Alternatively, the sensor 36 may be mounted to the housing 40 via an adhesive.

The housing 40 has a first end 42 and a second end 44. The first end 42 includes a first aperture 46 to allow the tube 24 to extend therefrom in sliding, sealing engagement. The second end 44 of the housing 40 includes a second aperture 48 to allow electrical leads 50 of the sensor 36 to extend therefrom in order to provide control of the induction bonding process, as will be described below. Alternatively, the second end 44 of the housing 40 may have an aperture 48 in which a display (not shown) is positioned to provide instantaneous temperature measurements to a user.

In accordance with a further aspect of the invention, the sensing device includes a variable rate coil spring 52. The coil spring 52 is mounted on the sensor 36 and biased against the mounting bracket 38 at one end and the housing 40 at its other end, thereby biasing the sensor 36 relative to the housing 40 along the common longitudinal axis. Biasing of the sensor 36 relative to the housing 40 is accomplished via a receiving chamber 54 provided in the second end 44 of the housing 40. The sensor 36 is telescopically received by the receiving chamber 54, whereby as the heat transfer member 30 bears against an irregular surface the sensor 36 will reciprocate along the longitudinal axis to cause the heat transfer member 30 to bear against the thermally conductive member at a constant contact force. In FIG. 2, the tube 24 is shown in its fully extended position. It is supported at end 26 by the housing 40 at aperture 46 and at the far end of optical sensor 36 by engagement within receiving chamber 54. The length of chamber 54 defines the maximum travel permitted the member 30 and tube 24.

Also in accordance with the invention, the sensor 36 of the sensing device 10 is electrically coupled to a controller 22. The controller 22 controls the extent of conductive heat energy from the thermally conductive member based on the detected heat radiated through the tube 24. Thus, the controller 22 allows the strength of the bond between two thermally conductive members to be controlled.

Figure 3:
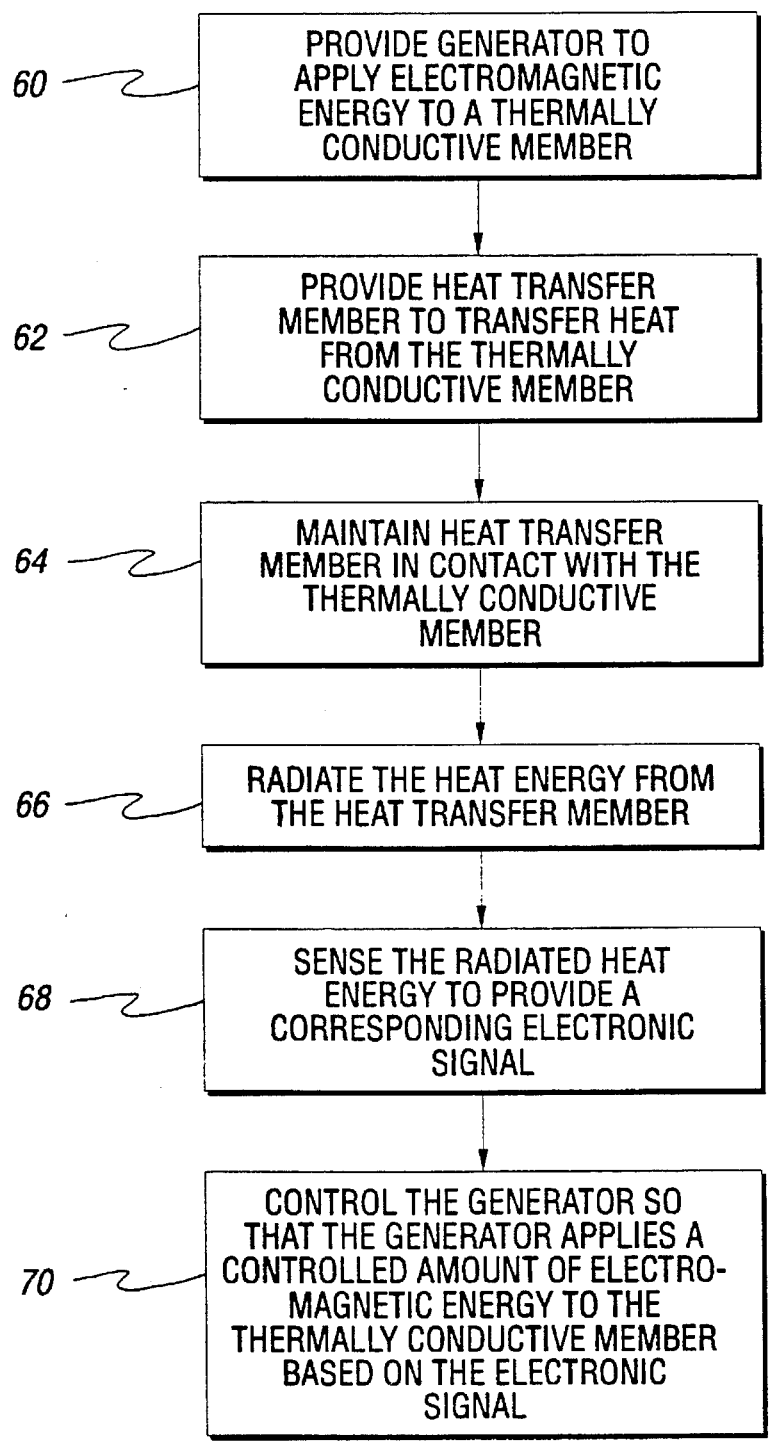
FIG. 3 is a block diagram illustrating the sequence of steps associated with the present invention.

Referring now to FIG. 3, the method of the present invention is illustrated. The method of the present invention begins with the step of providing a generator to apply an electromagnetic field to a thermally conductive member, as shown by block 60.

Next, block 62 illustrates the second step of the method, providing a heat transfer member to transfer heat energy from the thermally conductive member.

As shown by block 64, the method next includes the step of maintaining the heat transfer member in contact with the thermally conductive member so that heat is transferred from the thermally conductive member to the heat transfer member. Preferably, this step includes applying a constant contact force to the thermally conductive member.

Next, as shown by block 66, the method includes the step of radiating the heat energy from the heat transfer member. This step includes radiating the heat energy from the heat transfer member in a linear path.

As shown by block 68, the method next includes the step of sensing the radiated heat energy from the heat transfer member along the linear path to provide a corresponding electronic signal.

Finally, the method includes the step of controlling the generator so that the generator applies a controlled amount of electromagnetic field to the thermally conductive member based on the electronic signal, as shown by block 70.

Alternatively, the method includes the step of providing a shield around the linear path. This is accomplished in the present invention via a thermally insulative tube mounted to the heat transfer member and the sensor. Also, the method includes the step of maintaining a linear distance between the heat transfer member and the sensor.

Thus, it is apparent that there has been provided, in accordance with the invention, a contamination-resistant, temperature-sensing device 10 that fully satisfies the objects, aims and advantages set forth above.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A method for controlling an electromagnetic field applied to a thermally conductive member during an adhesive curing process, the method comprising:

applying the electromagnetic field to the thermally conductive member;

providing a heat transfer member for transferring heat energy from the thermally conductive member;

maintaining the heat transfer member in contact with the thermally conductive member so that heat energy is transferred from the thermally conductive member to the heat transfer member;

sensing the heat energy transferred to the heat transfer member and generating a corresponding electronic signal; and controlling the amount of electromagnetic field applied to the thermally conductive member based on the electronic signal.

2. The method of claim 1 wherein the step of maintaining the heat transfer member in contact with the thermally conductive member includes the step of applying a constant contact force to the thermally conductive member.

3. The method of claim 1 wherein the step of sensing the heat energy includes the step of radiating the heat energy transferred to the heat transfer member in a linear path.

4. The method of claim 3 wherein the step of radiating the heat energy includes the step of providing a shield around the linear path so as to minimize heat loss.

5. The method of claim 1 wherein the heat transfer member is a metal disk.

6. The method of claim 5 wherein the metal disk has a first surface and a second surface and wherein the second surface is coated with a material so as to provide constant emissivity.

7. The method of claim 1 wherein the sensor is an optical sensor.

8. The method of claim 1 wherein the thermally conductive member is an automotive body panel.

9. A system for controlling an electromagnetic field applied to a thermally conductive member during an adhesive curing process, the system comprising:

a generator for applying the electromagnetic field to the thermally conductive member;

a heat transfer member for transferring conductive heat energy from the thermally conductive member to the heat transfer member;

a sensor for sensing the heat energy transferred to the heat transfer member and generating a corresponding electronic signal; and a controller for controlling the amount of electromagnetic field applied by the generator to the thermally conductive member based on the electronic signal.

10. The system as recited in claim 9 wherein the heat transfer member is further provided for radiating the transferred heat energy along a linear path.

11. The system as recited in claim 10 further comprising means for providing a shield around the linear path so as to minimize heat loss.

12. The system as recited in claim 9 further comprising means for maintaining the heat transfer member in constant contact with the thermally conductive member.

13. The system as recited in claim 9 wherein the heat transfer member is a metal disk.

14. The system as recited in claim 13 wherein the metal disk has a first surface and a second surface and wherein the second surface is coated with a material so as to provide constant emissivity.

15. The system as recited in claim 9 wherein the sensor is an optical sensor.

16. The system as recited in claim 9 wherein the thermally conductive member is an automotive body panel.

* * * * *